US012546982B2

United States Patent
Badon et al.

(10) Patent No.: US 12,546,982 B2
(45) Date of Patent: Feb. 10, 2026

(54) AUGMENTED-FIELD-OF-VIEW, HIGH-RESOLUTION OPTICAL MICROSCOPY METHOD AND OPTICAL MICROSCOPE

(71) Applicants: UNIVERSITE DE BORDEAUX, Bordeaux (FR); CENTRE NATIONAL DE LA RECHERCHE SCIENTIFIQUE, Paris (FR); INSTITUT D'OPTIQUE THÉORIQUE ET APPLIQUÉE - IOTA, Palaiseau (FR)

(72) Inventors: Amaury Badon, Mérignac (FR); Gaëlle Recher, Talence (FR); Pierre Nassoy, Bordeaux (FR)

(73) Assignees: UNIVERSITE DE BORDEAUX, Bordeaux (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 195 days.

(21) Appl. No.: 18/690,668

(22) PCT Filed: Sep. 9, 2022

(86) PCT No.: PCT/EP2022/075139
§ 371 (c)(1),
(2) Date: Mar. 8, 2024

(87) PCT Pub. No.: WO2023/036946
PCT Pub. Date: Mar. 16, 2023

(65) Prior Publication Data
US 2024/0418973 A1 Dec. 19, 2024

(30) Foreign Application Priority Data
Sep. 10, 2021 (FR) ........................... 2109516

(51) Int. Cl.
*G02B 21/00* (2006.01)
(52) U.S. Cl.
CPC ....... *G02B 21/008* (2013.01); *G02B 21/0048* (2013.01); *G02B 21/0052* (2013.01)
(58) Field of Classification Search
CPC .............. G02B 21/008; G02B 21/0048; G02B 21/0052; G02B 21/18; G02B 26/101;
(Continued)

(56) References Cited

U.S. PATENT DOCUMENTS

2005/0243412 A1 11/2005 Bellouard et al.
2011/0096393 A1 4/2011 Araki
(Continued)

FOREIGN PATENT DOCUMENTS

DE 202005021436 U1 2/2008
DE 102009010446 A1 9/2010
(Continued)

OTHER PUBLICATIONS

International Search Report for PCT/EP2022/075139 dated Dec. 5, 2022, 9 pages.
Written Opinion of the ISA for PCT/EP2022/075139 dated Dec. 5, 2022, 6 pages.

*Primary Examiner* — Alazar Tilahun
(74) *Attorney, Agent, or Firm* — NIXON & VANDERHYE

(57) ABSTRACT

The invention relates to an optical microscope (100) and a microscopy method. According to the invention, the microscope comprises an imaging module (200) comprising an optical beam splitter (40), a first optical system (41, 42, 43), a first camera (51), a second optical system (44, 45, 46, 47) and a second camera (52), the second optical system (44, 45, 46, 47) and the second camera (52) being configured to acquire a low-magnification image, and the first optical system (41, 42, 43) comprising a reflective scanning device (Continued)

(42, 48) placed in a plane (72) optically conjugate with the Fourier plane (71) of the optical microscope (100), a controller (300) being configured to angularly orient the reflective scanning device (42, 48) so that the first camera (51) acquires at least one first image (61, 62, . . . , 6N) of a portion of the object field of the microscope objective (21, 22, 23).

20 Claims, 3 Drawing Sheets

(58) Field of Classification Search
 CPC .............. G02B 21/0088; G02B 21/088; G02B 21/365; G02B 21/361
 See application file for complete search history.

(56) References Cited

U.S. PATENT DOCUMENTS

| | | | |
|---|---|---|---|
| 2014/0146376 A1 | 5/2014 | Kleppe et al. | |
| 2015/0192767 A1* | 7/2015 | Li | G02B 21/367 |
| | | | 359/372 |
| 2018/0074306 A1 | 3/2018 | Visscher et al. | |
| 2018/0202935 A1 | 7/2018 | Bahlman et al. | |
| 2020/0146545 A1* | 5/2020 | Kumar | G06T 11/008 |

FOREIGN PATENT DOCUMENTS

| | | |
|---|---|---|
| DE | 102016120312 B3 | 10/2017 |
| EP | 2606394 A1 | 6/2013 |
| WO | 2012024627 A1 | 2/2012 |

\* cited by examiner

AUGMENTED-FIELD-OF-VIEW, HIGH-RESOLUTION OPTICAL MICROSCOPY METHOD AND OPTICAL MICROSCOPE

CROSS-REFERENCE TO RELATED APPLICATIONS

This application is the U.S. national phase of International Application No. PCT/EP2022/075139 filed Sep. 9, 2022 which designated the U.S. and claims priority to FR Patent Application No. 2109516 filed Sep. 10, 2021, the entire contents of each of which are hereby incorporated by reference.

PRIOR ART

The present invention relates to the technical field of optical microscopy and acquisition of high-resolution images using optical microscopy.

BACKGROUND OF THE INVENTION

In the above-mentioned field, it is known to integrate a camera on an output port of an optical microscope to acquire images using the microscope. It is also known to change part of the optical system of the microscope, by switching the microscope objective and/or the optical elements inside the microscope, to increase the magnification of the optical system between the sample and the camera. Such a magnification change enables to increase the spatial resolution of the microscopy image formed on the camera.

However, the spatial resolution increase is generally accompanied with a reduction in the image field on the camera. To obtain an image of different regions of interest in a sample, a sample-holder displacement stage is usually used to bring the region of interest to the centre of the high-resolution image.

However, the mechanical movements associated with moving the sample holder or switching part of the optical system can induce vibrations that are harmful to certain fragile and mobile samples, such as biological samples in solution, e.g. colloidal suspensions, organoids. Moreover, these mechanical movements generally lead to misalignment between the different images. Finally, these systems are relatively slow.

There is a need for an optical microscopy image acquisition device and method that has both a high resolution and a wide image field, and that is fast and vibration-free.

SUMMARY OF THE INVENTION

In order to remedy the above-mentioned drawbacks of the state of the art, the present invention proposes an optical microscope having a microscope body and a housing surrounding the microscope body, the optical microscope comprising a sample holder adapted to receive a sample in an object plane, a microscope objective adapted to collect an image beam from an object field in the object plane and to form an intermediate image of the object field in an image plane, the optical microscope having a Fourier plane located between the object plane and the image plane inside the microscope housing.

More particularly, it is proposed according to the invention an optical microscope in which the housing includes an output port, and the optical microscope including an imaging module arranged outside the microscope housing and a controller, the imaging module comprising a first camera, a second camera, a beam splitter adapted to receive the image beam of the image plane and to form a first image beam and a second image beam, a first optical system arranged between the beam splitter and the first camera, a second optical system arranged between the beam splitter and the second camera, the second optical system and the second camera being configured to acquire a wide-view image capable of extending over the entire object field of the microscope objective, the first optical system having a higher magnification than the second optical system and the first optical system comprising an offset optical system arranged to offset the Fourier plane via the output port outside the housing and to form the image of the Fourier plane in an image Fourier plane, the first optical system including a reflective scanning device arranged in or near the image Fourier plane, optically conjugate with the Fourier plane of the optical microscope and the first optical system including a lens, the first camera being located in the focal plane of the lens, the controller being adapted to angularly orient the reflective scanning device in such a way that the first camera acquires at least one first image of a portion of the object field of the microscope objective, simultaneously with the wide-view image of the object field acquired by the second camera, and the controller being adapted to angularly orient the angular reflective scanning device in a series of at least two positions, the first camera being adapted to acquire a series of first images of at least two portions of the object field without moving the sample, without changing the microscope objective and without changing the optical magnification between the object field and the first camera, the microscope comprising an image processing system adapted to receive the series of first images and to reconstruct a high-resolution mosaic image of the object field.

This imaging module enables the observed area of the sample to be greatly enlarged, quickly and without having to physically move the sample.

Other non-limiting and advantageous features of the microscope according to the invention, taken individually or according to all the technically possible combinations, are the following.

Advantageously, the microscope comprises an eyepiece arranged to form a visual image of the object field.

Advantageously, the visual image extends over a field of view inscribed in the mosaic image.

According to an embodiment, the angular reflective scanning device comprises a plane mirror mounted on a galvanometric or motorised actuator, the plane mirror being movable about one or two axes.

According to another embodiment, the angular reflective scanning device comprises a micro-mirror-based micro electro-mechanical system.

The microscope is of the upright or inverted type.

According to a particular and advantageous aspect, the microscope comprises a display device adapted to display simultaneously the wide-view image of the object field and said at least one first image of a portion of the object field of the microscope objective.

The invention also proposes an optical microscopy method comprising the following steps: collecting an image beam from an object field in an object plane of a microscope objective and forming an intermediate image in an image plane optically conjugate with the object plane; collecting the image beam from the image plane and optically splitting it into a first image beam and a second image beam; transmitting the first image beam via a first optical system to a first camera, the first optical system including an angular reflective scanning device arranged in or near a plane optically conjugate with the Fourier plane of the optical microscope; and simultaneously, transmitting the second image beam via a second optical system to a second camera, the first optical system having a higher magnification than the second optical system; acquiring via the second camera a wide-view image capable of extending over the entire object field of the microscope objective; angularly orienting the reflective scanning device for acquiring via the first camera at least one first image of a portion of the object field of the microscope objective, simultaneously with the acquisition of the wide-view image via the second camera.

Obviously, the different features, alternatives and embodiments of the invention can be associated with each other according to various combinations, insofar as they are not incompatible or exclusive with respect to each other.

BRIEF DESCRIPTION OF DRAWINGS

Moreover, various other features of the invention emerge from the appended description made with reference to the drawings that illustrate non-limiting embodiments of the invention, and wherein.

It is to be noted that, in these figures, the structural and/or functional elements common to the different alternatives can have the same reference numbers.

DETAILED DESCRIPTION OF THE INVENTION

Figure 1:
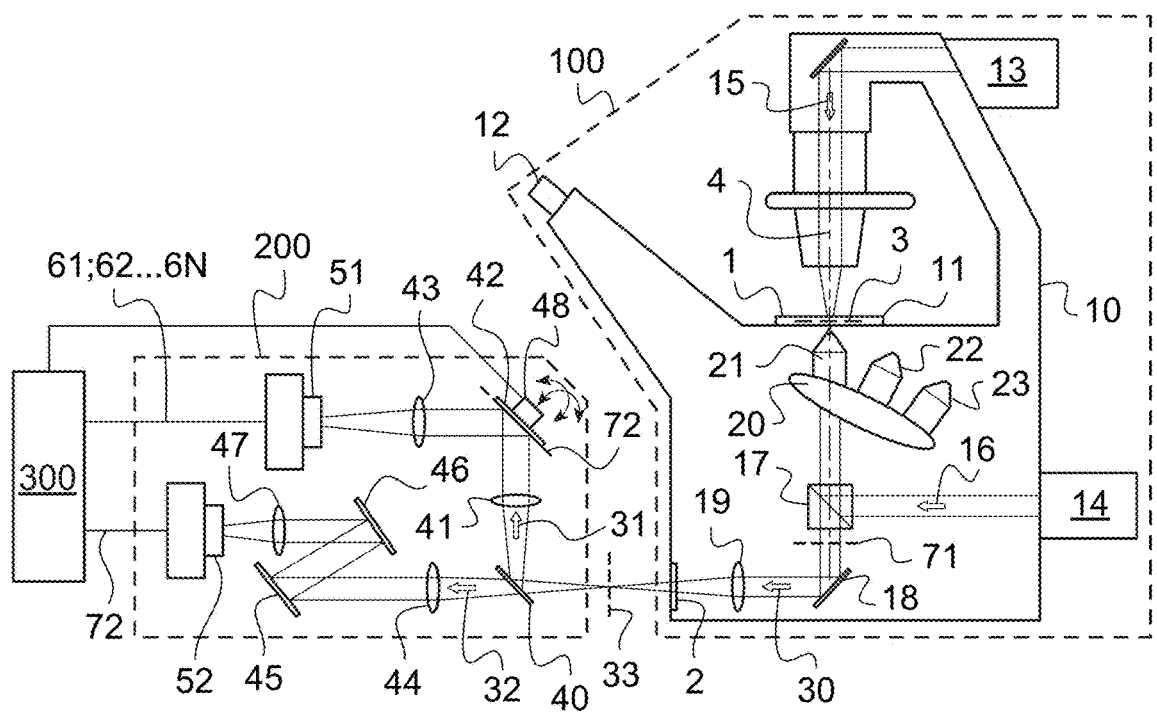
FIG. 1 is a schematic view of a microscope comprising an imaging module and a controller according to the invention.

FIG. 1 shows an optical microscope 100 to which is attached an imaging module 200 according to the invention. The imaging module is associated with a controller 300 including in particular an image processing system. The optical microscope 100 is here of the inverted type. For example, the microscope used is a Zeiss Axiovert 200 microscope. As an alternative, the present disclosure is easily adapted to an upright microscope.

Conventionally, the optical microscope 100 comprises a body or frame 10, a sample holder 11, at least one microscope objective 21, at least one light source 13 and/or 14, an eyepiece 12 and an output port 2.

Advantageously, the microscope includes several microscope objectives 21, 22, 23 having generally different magnifications, e.g. ×10, ×20, ×50, ×100. The microscope objectives 21, 22, 23 are mounted on an objective-holder rotary stage 20.

A sample 1 is placed on the sample holder 11. The sample is located in an object plane 3 of the microscope objective 21. The sample may be any type of physical, chemical or biological sample. In particular, the sample may be a biological sample in solution, e.g. a colloidal suspension, or contains an organoid in solution. The sample holder is here not motorized. The sample is positioned manually with respect to the microscope objective. Optionally, the sample holder is mounted on a displacement stage moving along one or several axes X, Y and/or Z.

The light source 13 enables to illuminate the sample 1 from the top, over a wide field. The other light source 14 illuminates the sample from the bottom, through the microscope objective 21. The light sources 13 and 14 are adapted to different imaging modes. The source 13 being a transmission light source is mainly used for bright field microscopy or phase imaging. The source 14 being a reflection light source is mainly used for fluorescence imaging.

As indicated hereinabove, the microscope of FIG. 1 is an inverted microscope. In other words, in the case where the light source 13 is used, the microscope collects the light transmitted by the sample and forms an image of the sample in an image plane 33. In the case where the other light source 14 is used, the microscope collects the light reflected by the sample or emitted by fluorescence via an optical beam splitter 17. In both cases, the image beam 30 is collected and propagated below the sample holder.

The user can observe the sample with the naked eye through the eyepiece 12. In this way, the user quickly visualizes a large circular image of the sample, formed in particular by the microscope objective and viewed through the eyepiece.

On the other hand, the microscope includes an internal optical imaging system comprising for example the beam splitter 17, a mirror 18 and a lens optical system 19. This optical imaging system forms en image of the sample in the image plane 33. The image plane 33 is optically conjugate with the object plane 3 of the microscope objective 31. The Fourier plane of the microscope is denoted 71. For a microscope objective 21 corrected to infinity, the Fourier plane is located downstream of the microscope objective 21 and upstream of the lens 19. The Fourier plane 71 is located inside the microscope frame and is generally not accessible. On the other hand, the image plane 33 is generally located outside the microscope frame, the image beam 30 being transmitted through the output port 2.

In a conventional microscope, a camera is generally placed in the image plane 33 on the output port 2 to detect the sample image. However, the conventional image acquired by a camera in the image plane 33 is much smaller than the image observed through the eyepiece. Depending on the camera sensor, this acquired image is square or rectangular in shape. This difference between the image viewed through the eyepiece and the acquired image in the image plane 33 is due to the size of the sensor and to the number of pixels of the current cameras, generally limited to between 1 and 5 millions of pixels. The acquired image has a high spatial resolution associated with a reduced field extent in order to satisfy the Nyquist sampling conditions.

Figure 2:
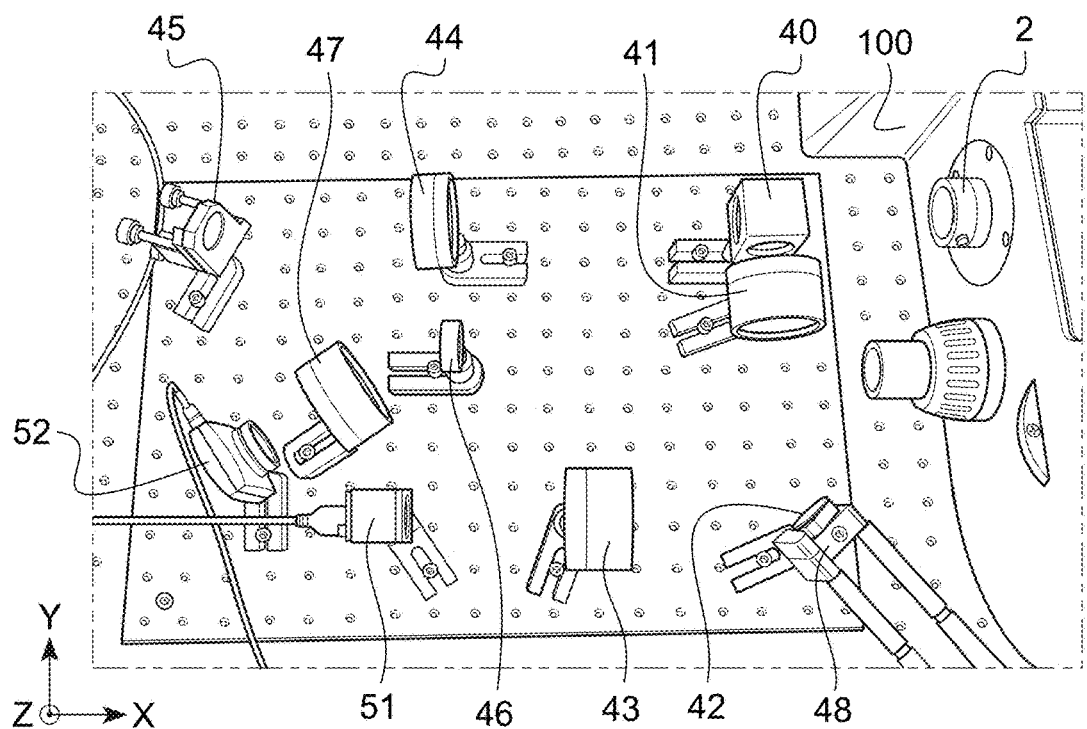
FIG. 2 is a top view of an imaging module according to an exemplary embodiment.

As illustrated in FIGS. 1 and 2, the imaging module 200 is used in place of the conventional image detector placed on the output port. The imaging module 200 includes an optical beam splitter 40, a first camera 51 and a second camera 52. The optical beam splitter 40 receives the image beam 30 from the output port 2. The optical beam splitter 40 angularly splits the image beam 30 into a first image beam 31 propagating in one direction and a second image beam 32 propagating in another direction. The optical beam splitter 40 can have an energy distribution of 50-50, i.e. 50% on each arm. As an alternative, the energy distribution of the optical beam splitter 40 can be different, for example 80-20.

A first optical system is arranged between the optical beam splitter 40 and the first camera 51. The first optical system comprises for example a lens 41, a plane mirror 42 and another lens 43. The first optical system directs the first image beam 31 towards the first camera 51. The lenses 41 and 43 have for example identical focal lengths. By way of example, lenses 41, 43 with a focal length of 100 mm are used.

A second optical system is arranged between the optical beam splitter 40 and the second camera 52. The second optical system comprises for example a lens 44, a reflective optical system with two mirrors 45 and 46, and another lens 47. Preferably, the second optical system is fixed. The second optical system directs the second image beam 32 towards the second camera 52. The two mirrors 45 and 46 are flat and are used to fold the optical path to make the imaging module 200 more compact. The lenses 44 and 47 are chosen to form an optical system with a magnification of less than 1. By way of example, a lens 44 with a focal length F1 of 250 mm and a lens 47 with a focal length of 75 mm are chosen. The ratio between the focal lengths of the lenses 44 and 47 is here of 0.3. The lens 44 of focal length F1 is placed at distance F1 from the image plane 33 at the microscope output. Between the lenses 44 and 47, the second image beam 32 is collimated. Therefore, the beam incident on the mirrors 45 and 46 is collimated. The second camera 52 is placed in the focal plane of the lens 47. The second optical system and the second camera 52 are thus arranged and configured to allow acquiring a wide-view image 60 extending for example over the entire object field of the microscope objective 21. This wide-view image 60 is generally square or rectangular in shape and has at least the same field as the image viewed through the eyepiece.

The first optical system has a higher magnification than the second optical system. In the example described in detail hereinabove, the first optical system has a magnification of 1 and the second optical system has a magnification of 0.3.

Figure 3:
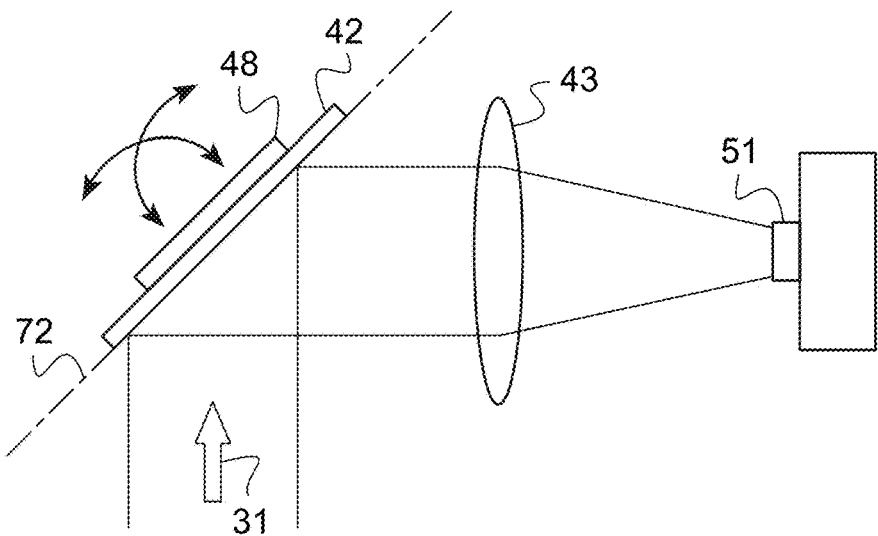
FIG. 3 is a schematic view of an angular reflective scanning device according to an embodiment.

Moreover, the first optical system includes a reflective scanning device. In the embodiment illustrated in FIGS. 1 to 3, the reflective scanning device comprises a plane mirror 42 mounted on an actuator 48 mobile about at least one axis of rotation and preferably two axes of rotation. In FIG. 2, the actuator includes servomotors for pivoting the mirror 42 about two transverse axes of rotation. As an alternative, a two-axis galvanometric actuator is used, which allows faster scanning than servomotors. In another embodiment, the angular reflective scanning device comprises a micro-mirror-based micro electro-mechanical system (MEMS). MEMS also allows faster scanning than servomotors.

The lens 41 of focal length F2 is placed at distance F2 from the image plane 33 at the microscope output. A plane 72 optically conjugate with the Fourier plane 71 of the optical microscope 100 is obtained downstream from the lens 41, at distance F2 from this lens 41. In other words, the lens 41 forms the Fourier plane 71 in an image Fourier plane, denoted 72. The plane mirror 42 is arranged near or in the image Fourier plane 72. The first image beam 31 incident on the plane mirror 42 is collimated. An electronic controller 300 enables to control the orientation of the actuator 48 and thus the angular position of the plane mirror 42. The first camera 51 is placed in the focal plane of the lens 43.

Figure 4:
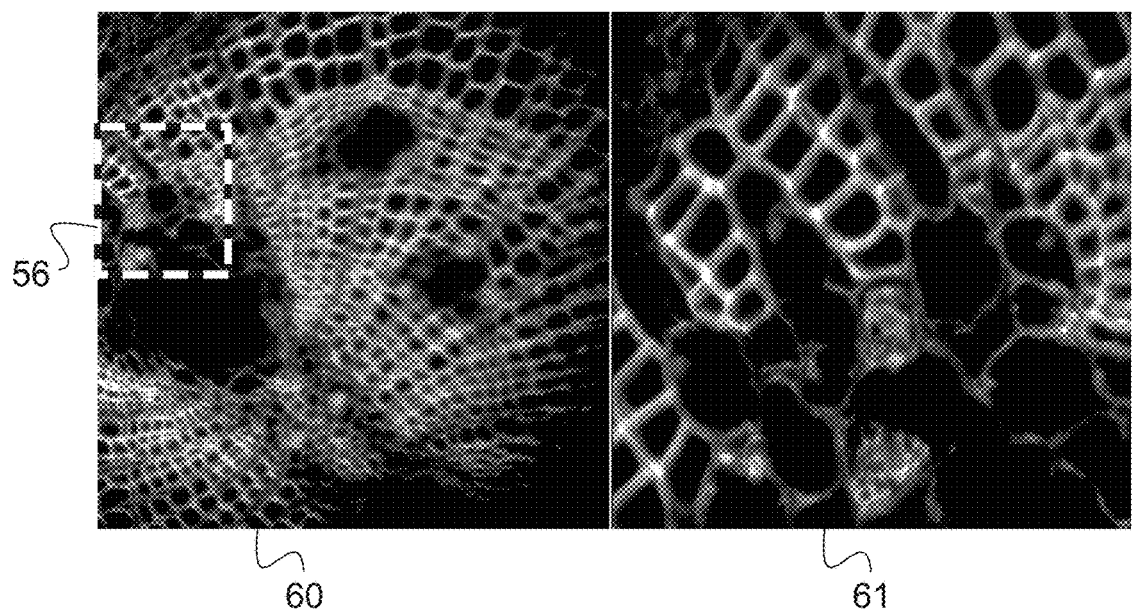
FIG. 4 is an example of a low-resolution wide-view image of the object field and a first image of a portion of the object field captured simultaneously.

The plane mirror 42 being oriented in a first position, the first camera 51 acquires a first image 61 of a portion or the object field of the microscope objective 21. The acquisition of the first image 61 of the first camera 51 and of the wide-view image 60 of the second camera 52 can be simultaneous. As illustrated in FIG. 4, this thus provides a wide-view image 60, in particular of the entire object field of the sample, and a first, higher resolution image 61 of a smaller portion of the object field than the wide-view image 60. The wide-view image 60 and the first image 61 can be displayed on one or more display screens. The wide-view image displayed is refreshed in real time. This real-time display is a major advantage in the case of biological samples or samples with physico-chemical reactions that are likely to change over time. Moreover, the simultaneous display of the wide-view image 60 and the first image 61 enables the user to locate the position of the first high-resolution image 61 in the object field of the wide-view image, knowing the position of the actuator 48 of the mirror 42. In FIG. 4, the contours corresponding to the first image 61 displayed alongside are shown on the wide-view image 60. The first image 61 and, possibly, the wide image, are stored in memory, for example in the memory of a computer or the controller 300. The coordinates of the first position of the plane mirror 42 corresponding to the first image 61 are also stored in memory.

The plane mirror 42 being oriented in a second position, the first camera 51 acquires a second image 62 of another portion of the object field of the microscope objective 21. The coordinates of the second position of the plane mirror 42 corresponding to the second image 62 are stored in memory. The second image 62 is displayed on the screen and also recorded in memory. High-resolution images of different portions of the sample can therefore be obtained simply by orienting the mirror 42 and without moving the sample. The first image 61 and the second image 62 have the same spatial resolution. Moreover, the simultaneous display of the wide-view image, the first image 61 and the second image 62, enables the user to navigate easily in the object plane via the orientation of the mirror 42 in the image Fourier plane 62. It is reminded that the wide-view image is updated in real time. By a calibration establishing the correspondence between the position of the mirror and the position in the object field, the user knows the position of each high-resolution image relative to the object plane. The order of magnitude of the inclination of the mirror 42 to move the imaged area of the image is a few degrees, for example 5 degrees.

Figure 5:
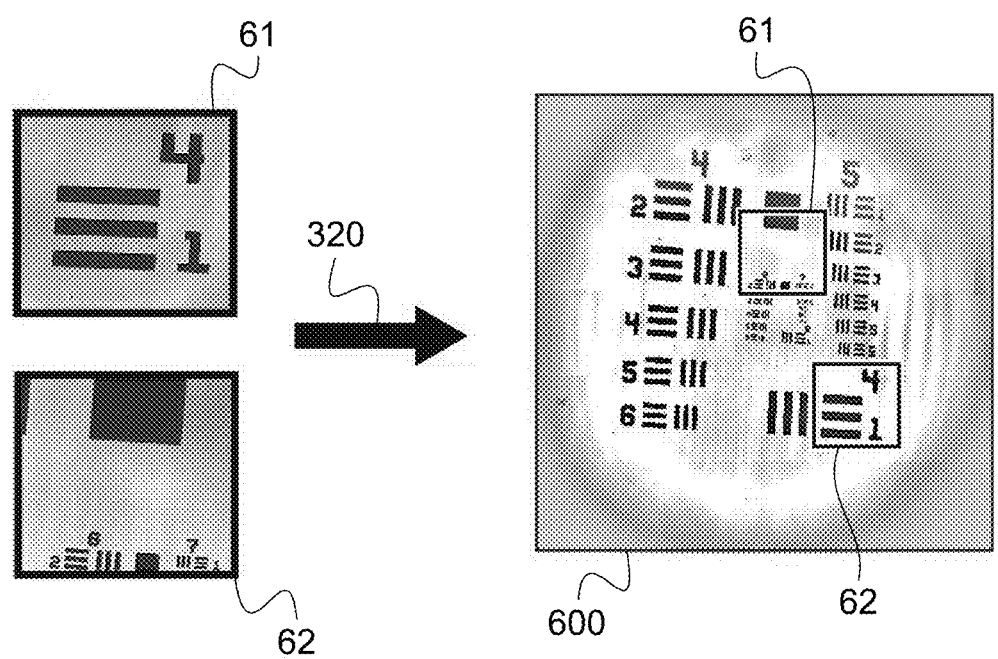
FIG. 5 is a schematic view illustrating an example of reconstruction of a high-resolution mosaic image of the object field.

In the same way, with the mirror successively oriented in N different orientations, a series of N second images 61, 62, . . . 6N are acquired, which are stored in memory together with the corresponding positions of the mirror 42 for each image acquired. The controller comprises an image processing system which can reconstruct a high-resolution mosaic image 600 of the sample from the series of N second images 61, 62, . . . 6N as shown in FIG. 5.

The image reconstruction method is based, for example, on the well-known image stitching or merging method. The image stitching or merging process uses only high-resolution images and stitches them together by finding identical elements between two neighbouring images. In case of overlap at the edge of the images, several possibilities exist, such as averaging the two overlapping images.

The mosaic image 600 can be constructed and updated as the second images 61, 62, . . . 6N are acquired. The result is hence a mosaic image with both a wide field of view and high resolution over the entire field. Moreover, the first wide-view image can be displayed in real time simultaneously and alongside the mosaic image 600. This configuration enables to orient that high-resolution image acquisition in a part of the evolving wide-view image, for example, while retaining the other high-resolution images all around.

The use of the image scanning device allows the acquisition and reconstruction of a wide-field, high-resolution mosaic image without moving the sample on the sample holder. When relatively slow servo-motors are used, the complete reconstruction of a mosaic image is limited by the travel time of the servo-motors. The use of galvanometric actuators or MEMS enables higher movement speeds of the scanning device. The acquisition and reconstruction rate of a mosaic image is then limited by the acquisition rate of the first camera 51. For example, if the number N of images required to reconstruct a mosaic image on the high-resolution overview field is equal to 10, the total acquisition time is only equal to 10 times the acquisition time of a single image, i.e. only a few milliseconds.

The imaging module 200 thus enables a high-resolution mosaic image to be obtained over a wide field of view without moving the sample and without changing the microscope objective. Therefore, there is no offset between the different images acquired 61, 62, . . . 6N. The imaging module 200 can be used to enhance the performance of an existing microscope at a moderate cost.

In the example detailed hereinabove, the imaging module enables to obtain a mosaic image with a field of view increased by a factor of 10 compared with a single first image 61, while still being fast. The system is easy to use. The imaging module 200 is compact (dimensions approx. 30 cm×30 cm×15 cm).

The same method can be applied regardless of the microscope objective used 21, 22 or 23.

The speed of the system is crucial in the field of biology, particularly for observing rapid phenomena and/or for fluorescence imaging where photobleaching is directly linked to the duration of exposure and/or the duration of the measurement. Another advantage of the invention relates to the reduction in the size of stored data. Only certain areas of interest of the sample can be imaged at high resolution, which enables not to unnecessarily store unused information. Here, the module differs from the use of a camera with a large number of pixels, which is expensive and records a large, high-resolution image, with no adjustment possible, and therefore produces a large amount of useless information.

The imaging module 200 is compatible with any conventional inverted microscope of the market. It allows the observed area of the sample to be greatly enlarged, quickly and without having to physically move the sample. At a moderate cost, it enables to greatly enhance the performance of an already existing microscope. It also enables to facilitate, by saving time, the correlative microscopy experiments aiming to combine electron microscopy and optical microscopy images.

The imaging module has a relatively low manufacturing cost, containing only low-cost components, compared with high-speed scanning systems such as resonant scanners.

The imaging module is used to implement an optical microscopy method. The microscopy method includes the following steps.

An image beam 30 is collected from the object field of a sample located in the object plane 3 of a microscope objective 21. An intermediate image is formed in an image plane 33 optically conjugate with the object plane 3.

The image beam 30 from the image plane 33 is collected and angularly split into a first image beam 31 and a second image beam 32.

The first image beam 31 is transmitted via the first optical system to the first camera 51, the first optical system comprising a reflective angular scanning device arranged in or near a plane 72 optically conjugate with the Fourier plane 71 of the optical microscope 100.

Simultaneously, the second image beam 32 is transmitted via the second optical system to the second camera 52. The first optical system has a higher magnification than the second optical system.

A wide-view image extending, for example, over the entire object field of the microscope objective 21 is acquired via the second camera 52.

The reflective scanning device is angularly oriented to acquire, via the first camera 51, at least one first image 61 of a portion of the object field of the microscope objective 21, 22, 23.

A wide-view image 60 and at least one first image 61 of a portion of the object field are thus available simultaneously without changing the microscope objective. By changing the orientation of the reflective scanning device in N different orientations, a series of N second images 61, 62, . . . 6N is acquired in succession. In step 320, the various images 61, 62, . . . 6N thus obtained are stitched so as to reconstruct a wide-view, high-resolution mosaic image 600 over at least part of the mosaic image. The mosaic image, which has both a high resolution and a wide field, is obtained without moving the sample and without changing the microscope objective.

The present disclosure has applications in the field of observation of samples sensitive to displacement, particularly in biology (cells, organoids, embryos, etc.) but also in physics (e.g., nanofilms) or chemistry (e.g. colloidal suspensions).

Of course, various other modifications can be made to the invention within the scope of the appended claims.

The invention claimed is:

1. An optical microscope (100) having a microscope body and a housing (10) surrounding the microscope body, the optical microscope comprising a sample holder (11) adapted to receive a sample (1) in an object plane (3), a microscope objective (21, 22, 23) adapted to collect an image beam (30) from an object field in the object plane (3) and to form an intermediate image of the object field in an image plane (33), the optical microscope having a Fourier plane (71) located between the object plane (3) and the image plane (33) inside the microscope housing, wherein the housing includes an output port, and the optical microscope includes an imaging module (200) arranged outside the microscope housing and a controller (300), the imaging module (200) comprising a first camera (51), a second camera (52), an optical beam splitter (40) adapted to receive the image beam (30) of the image plane (33) and to form a first image beam (31) and a second image beam (32), a first optical system (41, 42, 43) arranged between the beam splitter (40) and the first camera (51), a second optical system (44, 45, 46, 47) arranged between the beam splitter (40) and the second camera (52), the second optical system (44, 45, 46, 47) and the second camera (52) being configured to acquire a wide-view image capable of extending over the entire object field of the microscope objective (21, 22, 23), the first optical system (41, 42, 43) having a higher magnification than the second optical system (44, 45, 46, 47) and the first optical system (41, 42, 43) comprising an offset optical system (41) arranged to offset the Fourier plane (71) via the output port outside the housing and to form the image of the Fourier plane (71) in an image Fourier plane (72), the first optical system (41, 42, 43) including a reflective scanning device (42, 48) arranged in or near the image Fourier plane (72), optically conjugate with the Fourier plane (71) of the optical microscope (100) and the first optical system (41, 42, 43) including a lens (43), the first camera (51) being located in the focal plane of the lens (43), the controller (300) being adapted to angularly orient the reflective scanning device (42, 48) in such a way that the first camera (51) acquires at least one first image (61, 62, . . . , 6N) of a portion of the object field of the microscope objective (21, 22, 23), simultaneously with the wide-view image of the object field acquired by the second camera (52), and the controller (300) being adapted to angularly orient the angular reflective scanning device (42, 48) in a series of at least two positions, the first camera (51) being adapted to acquire a series of first images (61, 62, . . . , 6N) of at least two portions of the object field without moving the sample, without changing the microscope objective and without changing the optical magnification between the object field and the first camera (51), the microscope (100) comprising an image processing system adapted to receive the series of first images (61, 62, . . . , 6N) and to reconstruct a high-resolution mosaic image (600) of the object field.

2. The optical microscope according to claim 1, comprising an eyepiece arranged to form a visual image of the object field.

3. The optical microscope according to claim 2, wherein the visual image extends over a field of view inscribed in the mosaic image.

4. The optical microscope according to claim 1, wherein the angular reflective scanning device (42, 48) comprises a plane mirror mounted on a galvanometric or motorised actuator, the plane mirror being movable about one or two axes.

5. The optical microscope according to claim 1, wherein the angular reflective scanning device (42, 48) comprises a micro-mirror-based micro electro-mechanical system.

6. The optical microscope according to claim 1, wherein the microscope is of the upright or inverted type.

7. The optical microscope according to claim 1, comprising a display device adapted to display simultaneously the wide-view image of the object field and said at least one first image (61, 62, . . . , 6N) of a portion of the object field of the microscope objective (21, 22, 23).

8. An optical microscopy method comprising the following steps:
    collecting an image beam (30) from an object field in an object plane (3) of a microscope objective and forming an intermediate image in an image plane (33) optically conjugate with the object plane (3);
    collecting the image beam from the image plane (33) and optically splitting it into a first image beam (31) and a second image beam (32);
    transmitting the first image beam (31) via a first optical system (41, 42, 43) to a first camera (51), the first optical system (41, 42, 43) including an angular reflective scanning device (42, 48) arranged in or near a plane (72) optically conjugate with the Fourier plane (71) of the optical microscope;
    and simultaneously, transmitting the second image beam (32) via a second optical system (44, 45, 46, 47) to a second camera (52), the first optical system (41, 42, 43) having a higher magnification than the second optical system (44, 45, 46, 47);
    acquiring via the second camera (52) a wide-view image capable of extending over the entire object field of the microscope objective (21, 22, 23);
    angularly orienting the reflective scanning device (42, 48) for acquiring via the first camera (51) at least one first image (61, 62, . . . , 6N) of a portion of the object field of the microscope objective (21, 22, 23), simultaneously with the acquisition of the wide-view image via the second camera (52).

9. The optical microscope according to claim 2, wherein the angular reflective scanning device (42, 48) comprises a plane mirror mounted on a galvanometric or motorised actuator, the plane mirror being movable about one or two axes.

10. The optical microscope according to claim 3, wherein the angular reflective scanning device (42, 48) comprises a plane mirror mounted on a galvanometric or motorised actuator, the plane mirror being movable about one or two axes.

11. The optical microscope according to claim 2, wherein the angular reflective scanning device (42, 48) comprises a micro-mirror-based micro electro-mechanical system.

12. The optical microscope according to claim 3, wherein the angular reflective scanning device (42, 48) comprises a micro-mirror-based micro electro-mechanical system.

13. The optical microscope according to claim 2, wherein the microscope is of the upright or inverted type.

14. The optical microscope according to claim 3, wherein the microscope is of the upright or inverted type.

15. The optical microscope according to claim 4, wherein the microscope is of the upright or inverted type.

16. The optical microscope according to claim 5, wherein the microscope is of the upright or inverted type.

17. The optical microscope according to claim 3, comprising a display device adapted to display simultaneously the wide-view image of the object field and said at least one first image (61, 62, . . . , 6N) of a portion of the object field of the microscope objective (21, 22, 23).

18. The optical microscope according to claim 4, comprising a display device adapted to display simultaneously the wide-view image of the object field and said at least one first image (61, 62, . . . , 6N) of a portion of the object field of the microscope objective (21, 22, 23).

19. The optical microscope according to claim 5, comprising a display device adapted to display simultaneously the wide-view image of the object field and said at least one first image (61, 62, . . . , 6N) of a portion of the object field of the microscope objective (21, 22, 23).

20. The optical microscope according to claim 6, comprising a display device adapted to display simultaneously the wide-view image of the object field and said at least one first image (61, 62, . . . , 6N) of a portion of the object field of the microscope objective (21, 22, 23).

* * * * *